United States Patent
Stalter et al.

(10) Patent No.: US 10,406,463 B2
(45) Date of Patent: Sep. 10, 2019

(54) FILTER DEVICE AND FILTER ELEMENT FOR SUCH A DEVICE

(71) Applicant: Hydac Technology Corporation, Bethlehem, PA (US)

(72) Inventors: Michael Stalter, Bethlehem, PA (US); Tim Barr, Allentown, PA (US)

(73) Assignee: HYDAC TECHNOLOGY CORPORATION, Bethlehem, PA (US)

( * ) Notice: Subject to any disclaimer, the term of this patent is extended or adjusted under 35 U.S.C. 154(b) by 1034 days.

(21) Appl. No.: 14/851,309

(22) Filed: Sep. 11, 2015

(65) Prior Publication Data
US 2017/0072348 A1    Mar. 16, 2017

(51) Int. Cl.
*B01D 27/08* (2006.01)
*B01D 35/30* (2006.01)
*B01D 29/21* (2006.01)

(52) U.S. Cl.
CPC .......... *B01D 35/306* (2013.01); *B01D 29/21* (2013.01); *B01D 35/30* (2013.01); *B01D 2201/291* (2013.01); *B01D 2201/305* (2013.01); *B01D 2201/347* (2013.01); *B01D 2201/4084* (2013.01)

(58) Field of Classification Search
CPC ...... B01D 35/306; B01D 35/30; B01D 29/21; B01D 2201/291; B01D 2201/305; B01D 2201/4084; B01D 2201/306

USPC ......................................................... 210/232
See application file for complete search history.

(56) References Cited

U.S. PATENT DOCUMENTS

| | | | | |
|---|---|---|---|---|
| 4,316,801 A | * | 2/1982 | Cooper ................ | B01D 35/143 210/90 |
| 4,420,396 A | * | 12/1983 | Yamamoto ............. | B01D 29/15 210/416.4 |
| 4,743,370 A | * | 5/1988 | Mizusawa ............. | B01D 29/111 210/460 |
| 5,725,621 A | * | 3/1998 | Pruette ............... | B01D 46/0031 210/238 |
| 2008/0179235 A1 | * | 7/2008 | Hacker .................. | B01D 29/21 210/232 |

FOREIGN PATENT DOCUMENTS

FR        2222880 A  *  11/1974

* cited by examiner

*Primary Examiner* — Thomas M Lithgow
(74) *Attorney, Agent, or Firm* — Wenderoth, Lind & Ponack, L.L.P.

(57) ABSTRACT

A filter device has a securing device (10) for securely fixing a filter element (12) on an element mount (14). The securing device (10) includes a securing ring (16), which may be moved by a control device (18) from a position in which the filter element (12) on the element mount (14) is released into a position in which the filter element (12) is fixed on the element mount (14).

13 Claims, 3 Drawing Sheets

FILTER DEVICE AND FILTER ELEMENT FOR SUCH A DEVICE

FIELD OF THE INVENTION

The invention relates to a filter device having a securing device for securely fixing a filter element on an element mount. The invention also relates to a filter element for a filter device so designed.

BACKGROUND OF THE INVENTION

A filter device is known from DE 10 2014 000 490 A1 and has a filter housing defining a main axis, in which at least one filter element is replaceably accommodated, and which has a housing pot surrounding the particular filter element. A housing head is removably attachable to the housing pot, has at least one fluid passage for the discharge flow of filtrate formed in it, and has a valve device associated with the fluid passage. The valve device includes a closing body that, in a closed position, blocks the discharge flow of filtrate and, in a release position, allows the discharge flow. A locking device includes a blocking element that, in a locking position, locks the closing body of the valve device in the closed position. The blocking element may be moved out of the locking position into an inoperative unlocking position by a control element provided on the particular filter element that, when the filter element is situated in the functional position in the housing pot, mechanically acts on the blocking element as the housing head is being attached to the housing pot.

Because in the known solution, the blocking element of the locking device is mounted in the housing pot for axial displacement along the main axis for its movement between the locking position and unlocking position and, when attaching the housing head, can be moved into the unlocking position through contact with the control element of the filter element, the blocking element may be moved by the control element of the filter element directly into the unlocking position during the relative axial movement taking place as the housing head is attached to the housing pot. In general, when actuating the known device with low actuation forces, a low material load also then occurs, which permits the use of cost-efficient materials, such as synthetic materials, for the relevant functional elements in the known solution.

When the housing head is attached to the housing pot in the known solution with no filter element situated in the functional position, a valve plate of the valve device remains locked in its closed position. The associated discharge flow valve then remains closed. In this case, a faulty initial operation with no filter element is ruled out as is the insertion of a non-fitting filter element, which may also constitute a type of inexpensive knock-off.

SUMMARY OF THE INVENTION

Based on this prior art, an object of the invention is to provide an improved filter device together with a filter element for such filter device, which absolutely ensures that the filter element, when being replaced with a new element, cannot by itself fall out of the housing so constructed due to its own weight upon opening the housing parts of the device. In addition, protection against knock-offs with respect to the filter element is to be achieved in a structurally simple manner.

Such object is basically achieved by a filter device having a securing device, which may be brought, in particular by hand, by a control device from a position in which the filter element on the element mount is released, to a position in which the filter element is fixed on the element mount. The securing device is preferably formed by a slotted, elastically flexible securing ring. The securing ring may be pushed over a bead-shaped control device on the element mount when mounting the filter element on the element connector, as the securing ring expands. Once the securing ring overcomes the bead of the control device, the securing ring, due to its inherent elasticity, retracts to its original position and fixes the filter element in a definitive and secured manner on the element mount of the filter device.

If the housing parts of the filter device are then separated from one another for replacement with a new element, for example, the filter element remains secured to the element mount regardless, due to the securing device with the securing ring. Only after the particular operator has applied an appropriate force, is it possible to remove, in reverse sequence, the filter element from the element mount, as a result of the securing ring traveling downward past the bead-shaped control device, in the process of which the securing ring is again expanded.

In one further refinement according to the invention, the replaceably designed filter element for the filter device includes the securing device together with the securing ring at one end cap of the filter element material, preferably pleated in design.

The securing ring is preferably a round wire securing ring or some other conventional securing ring, which may also be formed from synthetic material. In addition, non-slotted rings made of an elastomer material may also be used, if the operating temperatures of the filter device permit.

Particularly preferably, the control device is disposed in an annular manner on the element mount and is provided with two opposing approach ramps of the control device for the securing ring. The ramps converge at a common transition point as an actuating bead. The diameter of the actuating bead corresponds at least to the minimum expansion diameter of the securing ring. Due to the approach ramps, extending in a straight line as seen in cross-section, at a preferred inclination angle of between 30° to 45°, an energy-efficient, frictionless expansion of the securing ring takes place. The securing ring is able to pass over the bead-shaped transition point of the securing device with minimal actuating forces for a fixing or releasing of the filter element in both possible directions of travel.

To reliably guide the securing ring, a chamber housing is provided and accommodates the securing ring. In the radial expansion direction of the securing ring, the chamber housing includes an accommodation space that accommodates the securing ring once the ring passes over the bead-shaped transition point between the two approach ramps of the control device in the respective direction of travel.

The chamber housing, with the securing ring accommodated therein, forms a kind of spacer, which is fixed between two ring caps that are part of an end cap of the filter element. As such, the securing device can be integrated in a cost-efficient manner in the chamber as part of the end cap of the filter element.

In one preferred embodiment of the filter device according to the invention, one, in particular, lower ring cap of the end cap of the filter element is abutted by a flange-shaped sealing and guide surface, which may be brought into contact with a projecting engagement connection piece of the element mount. Further preferably in the sealed, fixed operating state of the device, the flange-shaped sealing and guide surface and the engagement connection piece engage in the filter element on the filtrate and clean side thereof. The installation height of the engagement connection piece corresponds at least to the height of the spacer, together with the length of the flange-shaped sealing and guide surface.

An effective safeguard against replication can be achieved, in particular with the latter mentioned feature combinations. According to the solution of the invention, the sealing surface and the securing of the filter element are both situated on the connection piece of the element mount of the filter device. This element mount connection piece is preferably part of the filter head of the housing of the filter device, and therefore, is not readily replaceable, since it accommodates parts of the fluid supply and fluid discharge and is fixedly connected to a hydraulic supply network.

Normally, the internal dimension of the filter housing of the filter device determines the fitting clearance for the filter element. However, it must be ensured in any case, that with a mount connection piece of suitable length, the sealing can occur in any position. Otherwise, the filter device is incapable of functioning.

This clearance can be minimized through the use of the securing ring. As a result of which, in turn, the sealing surface on the mount connection piece can be reduced. In the case of an inexpensive knock-off reconstruction, in which no securing element for the filter element is used, it then becomes difficult to compensate for the larger tolerances of the filter housing while maintaining the same element length and the same filter surface, and to ensure the sealing on the shortened mount connection pieces.

The securing of the filter element in the filter housing meets the customer demand of absolutely ensuring that the filter element, upon opening of the housing cover, cannot by itself fall out of the housing due to its own weight. Moreover, integrating the securing device with the securing ring in parts of the end cap of the filter element provides a solution, which may be advantageously used, in particular, in the case of minimal housing wall thicknesses. This structure has no counterpart in the prior art.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
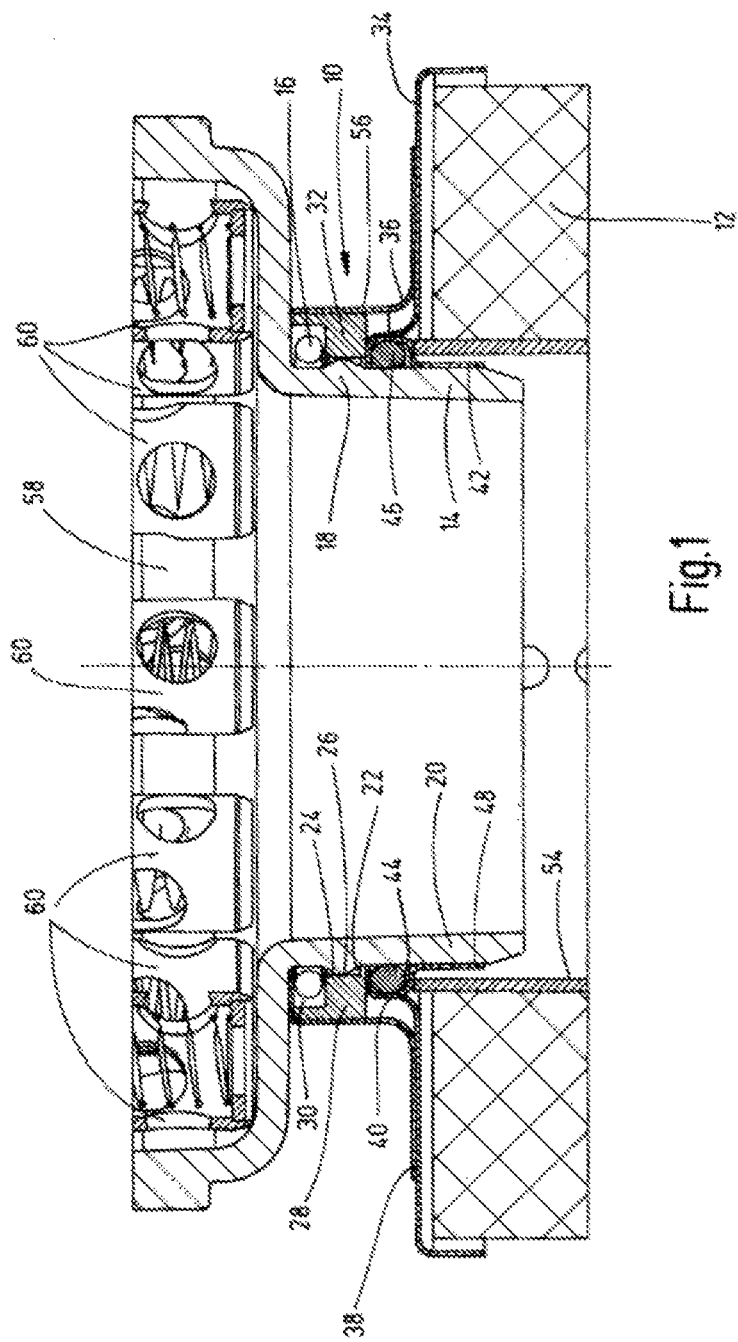
FIG. 1 is an enlarged, partial side view in section of a filter device with a securing device according to an exemplary embodiment of the invention.
Figure 3:
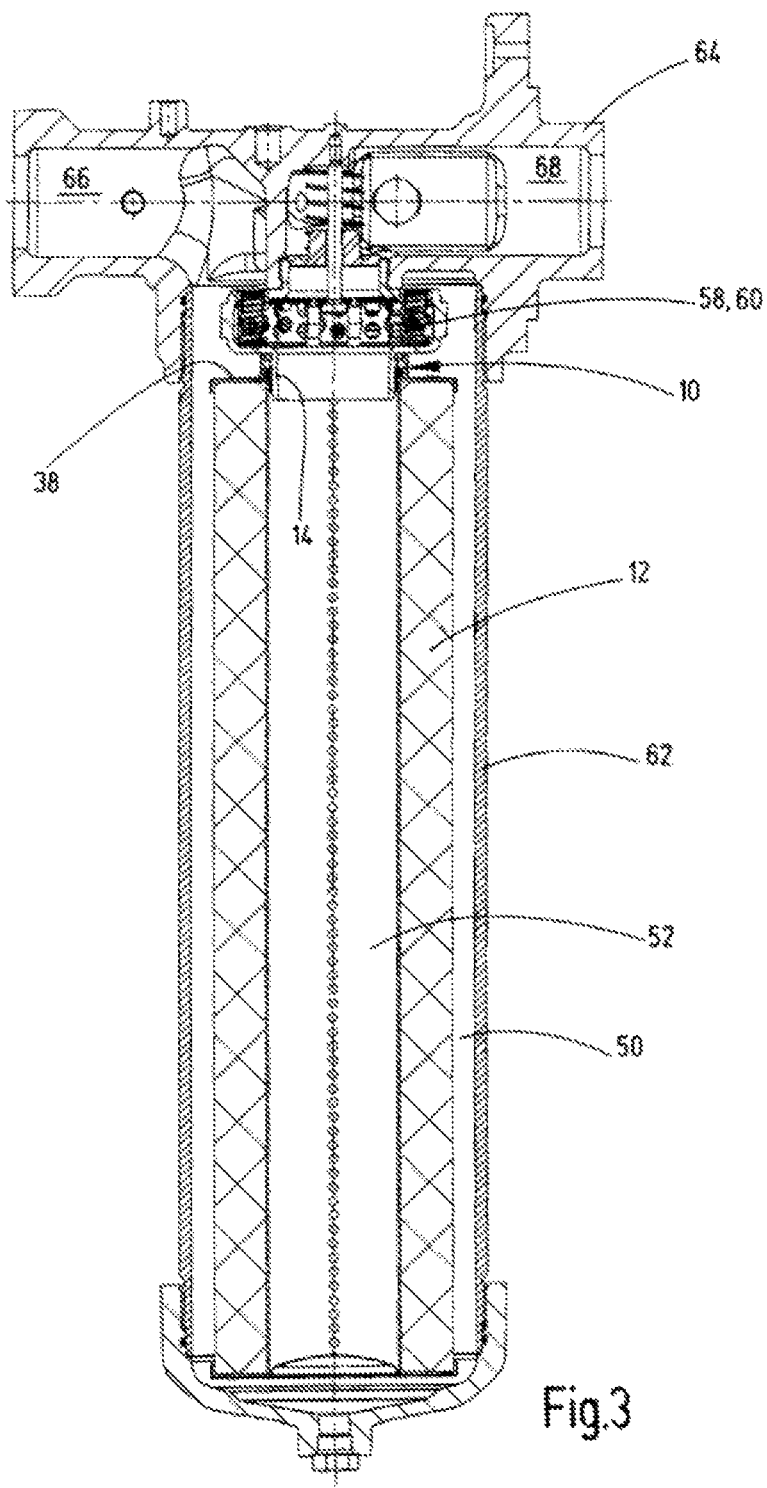
FIG. 3 is a side view in section of the filter device as a whole of FIG. 1.

FIG. 1 shows a part of the filter device according to the illustration of FIG. 3, including a securing device 10, for securely fixing a filter element 12 on an element mount 14. The securing device includes a securing ring 16 that is designed as a round wire and is slotted at one point (not depicted) and therefore elastically expandable. The securing ring 16, after expanding, also contracts again due to its inherent elasticity. A control device 18 is also present in order to be able to cause the securing ring 16 to expand and contract accordingly.

The control device 18 is disposed in an annular manner in the upper third on a cylindrical element connection piece or engagement connection piece 20 of the element mount 14, and includes two opposing approach ramps 22 and 24 for the securing ring 16. The two opposing approach ramps 22, 24 converge at the middle of a bead-shaped transition point 26. The maximum outer diameter of the transition point 26 in this case corresponds to the minimum possible expansion diameter of the securing ring 16. The control device 18, with its two approach ramps 22, 24, as well as with the transition point 26 formed by these approach ramps, is cylindrically designed as a closed annular body and as an integral component of the cylindrical element connection piece 20.

As further shown in the depiction of FIG. 1, the securing ring 16 is arranged in a chamber housing 28 that, as seen in the radial, potential expansion direction of the securing ring 16, includes an accommodation space 30, which accommodates the securing ring 16 in any case, even when the latter passes over the transition point 26 with the maximum outer diameter between the two approach ramps 22, 24 of the control device 16. For this purpose, the chamber housing 28 has a tiered configuration.

A spacer 32, in particular of the chamber housing 28 and the securing ring 16 accommodated therein, is fixed between two ring caps 34, 36, which are part of the upper end cap 38 of the filter element 12. The lower ring cap 34 as viewed in the direction of FIG. 1 overlaps the filter element 12 with its pleated filter element material outwardly from above and at its edge. On the opposite inner side, the lower ring cap 34 includes an axial projection 40, the upper free end of which is folded horizontally by 90°. The two side ends of the accommodation space 30, formed by the annular contact surfaces of end cap 38 and chamber housing 28, are used to transmit the required actuating force, with respect to the expansion force, to the securing ring 16 when installing and removing the filter element 12, in order to expand the ring 16 and to move it past the transition point 26.

A thin-walled ring element 42, which together with parts of the projection 40, delimits upwardly a sealed space 44 for accommodating an O-ring 46. O-ring 46 is inserted and fixed on the inner side of the projection 40. As such, the downwardly projecting ring element 42 attached to the lower ring cap 34 has a flange-shaped sealing and guide surface 48 that, according to the representation of FIG. 1, abuts the downwardly projecting engagement or element connection piece 20 of the element mount 14. As such, the flange-shaped sealing and guide surface 48, with its cylindrical shape and in abutment with the cylindrical outer surface of the engagement connection piece 20 in this region, engages in the interior of the filter element 12 from above. The filter element 12, with its filter element material, separates an unfiltrate side 50 from a filtrate side 52 on the inside of the filter element 12 (see also FIG. 3). The filter element 12 in this arrangement is braced on its inside against a perforated support tube 54 in a conventional manner. Only a portion of the circular fluid passage points are shown in the figures.

The upper ring cap 36 is fixed by a welded connection, for example, on the upper side of the ring cap 34, and recessed somewhat inwardly, and includes an additional vertically extending projection 56, which extends coaxially relative to the projection 40 of the lower ring cap 34. The vertically extending additional projection 56 in turn, is, as depicted in FIG. 1, flanged or folded inward at its upper free end and is braced in this region with its upper side against the lower side of the element mount 14. Starting from engagement connection piece 20, element mount 14 expands radially outward in order to thereby create a ventilation space 58 for accommodating individual ventilation bodies 60, which together form, in a conventional and therefore not further described manner, a kind of bypass valve. The bypass valve ensures the transfer of fluid, should the filter element 12 become blocked as a result of particulate contaminants removed from the fluid flow.

The additional projection 56, with its upper flanged edge, thus forms the upper limit of the accommodation space 30 of the chamber housing 28 with the securing ring 16. In addition, the securing ring 16, in the installed state of the filter element 12 on the element mount 14 shown in FIG. 1, accommodated in its chamber housing 28, is braced against the upper approach ramp 24, which decreases in diameter toward the fixed securing ring 16 starting from the transition point 26. As such, the securing ring 16 is also accordingly chambered on its inner circumferential side in its accommodation space 30 by the cylindrical outer circumferential wall of the element connection piece or engagement connection piece 20.

Figure 2:
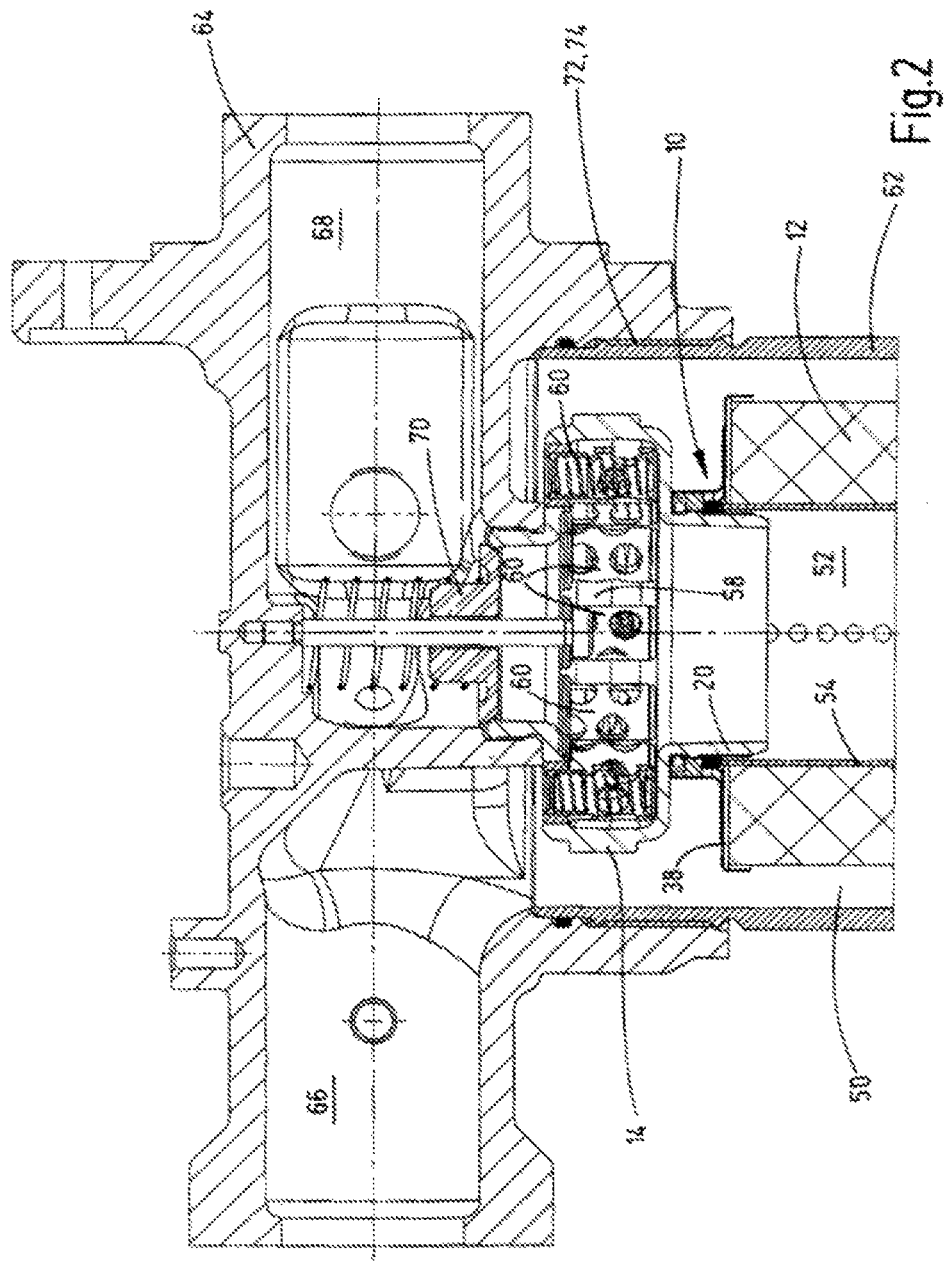
FIG. 2 is a partial side view in section of the upper connecting region of the filter head and filter pot of the filter housing with the securing device of FIG. 1.

The securing device 10 described above is part of an entire filter device, as is illustrated in greater detail in FIGS. 2 and 3.

Additional housing parts of the filter device include here a filter pot 62, which can be fixed to a filter head 64 intended to be fixedly mounted. The filter head 64 includes a supply connection 66 for unfiltrate and a discharge connection 68 for fluid from the filter device cleaned with the aid of the filter element. Also installed in the filter head 64 is a spring-loaded check valve 70 of conventional design, which releases the fluid connection from the interior of the filter element 12 to the discharge connection 68 when the filter device is in operation, and otherwise closes in the opposite direction. Below this check valve 70, as viewed in the direction of FIG. 2, are the valve bodies 60 in the valve chamber 58 of the element mount 14. The filter pot 62, which accommodates the entire filter element 12 (cf. FIG. 3), includes an outer thread 72 on its upper side, which may be meshed with an inner thread 74 of the filter head 64. The threaded connection can be secured via a pair of set screws, which are offset by 90° in the respective drawing plane and are therefore not visible.

If a change of filter is called for, the filter pot 62 is unscrewed from the filter head 64, wherein the filter element 12 continues to be held on the element mount 14 via its element connection piece 20 by the securing device 10 with the securing ring 16. If a technician removes the filter element 12 by hand, in a downward direction as seen in the orientation of the figures, the securing ring 16 of the securing device 10 stops at the upper approach ramp 24. The slotted, elastically flexible ring 16 expands in the process and is accommodated by the accommodation space 30 of the chamber housing 28, as long as the ring 16 passes the transition point 26 between the two approach ramps 22, 24. The ring 16, directed by the lower approach ramp 22, then contracts again and the element 12 is removed from the mount 14. A new element, which is identical in design to the preceding contaminated element 12 and includes the securing device 10, is then pushed from below onto the element or engagement connection piece 20, at which point the ring 16 expands at the lower approach ramp 22.

After passing over the transition point 26, the ring 16 contracts again and, according to the illustration of FIG. 1, is securely held on the element mount 14 and, therefore, also the filter element 12 on this element mount 14. The securing device according to the invention can be safely actuated by hand using minimal actuating forces and, as is shown in particular in FIG. 3, the filter element 12 is then held securely in the housing of the filter device between the element mount 14 on its upper side and by a bottom housing end cap 78 of the filter pot 62 on its lower side.

In an alternative preferred embodiment, however, it is provided to leave the cylindrical housing pot 62 screwed onto the filter head 64 and secured via the set screws, not further depicted. Accordingly, a changing of the filter element 12 merely requires the removal of the bottom housing end cap 78, which is screwed via threads to the bottom side of the housing pot or filter pot 62. In the solution as such, a seal in the form of an O-ring is then also provided between the top side of the filter pot 62 and the filter head 64, as illustrated in FIG. 3, as in the connection region between the bottom side of the filter pot 62 and the aforementioned end cap 78. In particular, in the solution as such, in which the housing end cap 78 is removed from the filter pot 62, it is practical to provide a securing device 10, with which the filter element 12 can initially be held on the element mount 14 until it is removed accordingly, such that it can be replaced with a new element in the manner described.

In principle, it is also possible to locate the securing device 10 together with the seal on the inner side of the engagement or mount connection piece 20, so that the securing ring is then compressed instead of expanded. The securing device 10 with the securing ring 16, not further depicted, could also be inserted in a recess in the engagement or mount connection 20 in the region of the openings of the connection piece 20. The upper end cap of the filter element 12, provided with a ramp-shaped control device, then engages from the inside into the opening thus formed that, in turn, results in an actuation of the securing ring and an expansion thereof until it reaches its final fixed position.

While one embodiment has been chosen to illustrate the invention, it will be understood by those skilled in the art that various changes and modifications can be made therein without departing from the scope of the invention as defined in the claims.

The invention claimed is:

1. A filter device, comprising:
an element mount with a control device thereon, said control device being annular including two opposing approach ramps, said approach ramps converging at a transition point;
a filter element; and
the filter element comprising a securing device releasably and securely fixing said filter element to said element mount, said securing device including a resiliently flexible securing ring radially movable by said control device between a first position in which said filter element is releasable from said element mount and a second position in which said filter element is fixed on said element mount, said securing ring being at least one of slotted or elastic, said opposing approach ramps being capable of moving said securing ring between the first and second positions, said transition point having an outer diameter corresponding to a minimal expansion diameter of said securing ring, said securing ring being in a chamber housing including an accommodation space accommodating said securing ring in a radial expansion direction of said securing ring when said securing ring engages either one of said approach ramps and when said securing ring engages said transition point.

2. A filter device according to claim 1 wherein
a spacer formed of said chamber housing and said securing ring accommodated in said chamber housing is formed between first and second ring caps, said first and second ring caps are parts of an end cap of said filter element.

3. A filter device according to claim 2 wherein
said first ring cap comprises a flange-shaped sealing and guide surface abutting and contacting a projecting engagement connection piece of said element mount.

4. A filter device according to claim 3 wherein
said first ring cap is a lower ring cap located between said second ring cap and said filter element.

5. A filter device according to claim 3 wherein
said flange-shaped sealing and guide surface and said projecting engagement connection piece are engaged in said filter element on a filtrate or clean side of said filter element in a sealed and fixed operating state of said filter element.

6. A device according to claim 3 wherein
said projecting engagement connection piece has an axial length at least equal to an axial length of said spacer with said flange-shaped sealing and guide surface.

7. A filter device according to claim 1 wherein
said securing ring, in an installed position of said filter element on said element mount, is braced in said chamber housing against an upper one said approach ramps being farther away from said filter element and decreasing in diameter in a direction away and starting from said transition point.

8. A filter device according to claim 2 wherein
said projecting engagement connection piece is cylindrical with a longitudinal axis; and
starting from said projecting engagement connection piece, said element mount expands in diameter radially relative to said longitudinal axis and overlaps said second ring cap on a side of said second ring cap; and
said first ring cap comprises said flange-shaped sealing and guide surface abutting and contacting said projecting engagement connection piece of said element mount.

9. A filter device according to claim 1 wherein
said element mount is connected to a filter head disposed on a filter pot containing said filter element.

10. A filter element, comprising:
a cylindrical filter material;
an end cap on an axial end of said filter material;
an elastically flexible securing ring being fixed on said end cap, being releasably and securely fixable to an element mount by being movable between radially contracted positions by a control device on the element mount, said securing ring being in a chamber housing including an accommodation space accommodating said securing ring in a radial expansion direction of said securing ring allowing said retaining ring to radially expand and contract in said accommodation space; and
a spacer formed of said chamber housing and said securing ring accommodated in said chamber housing being between first and second ring caps, said first and second ring caps being parts of said end cap on said filter element.

11. A filter element according to claim 10 wherein
said first ring cap comprises a flange-shaped sealing and guide surface abuttable and contactable a projecting engagement connection piece of the element mount.

12. A filter element according to claim 11 wherein
said first ring cap is a lower ring cap located between second ring cap and said filter material.

13. A filter element according to claim 11 wherein
said flange-shaped sealing and guide surface is engaged in said filter material on a filtrate or clean side of said filter material.

* * * * *